June 30, 1959 R. C. KOCH 2,892,931

TRANSISTOR RADIO APPARATUS

Filed March 25, 1955 2 Sheets-Sheet 1

INVENTOR.
RICHARD C. KOCH

BY

ATTORNEY

TRANSISTOR RADIO APPARATUS

Filed March 25, 1955 2 Sheets-Sheet 2

INVENTOR.
RICHARD C. KOCH
BY George R. Gust
ATTORNEY

United States Patent Office 2,892,931

Patented June 30, 1959

2,892,931

TRANSISTOR RADIO APPARATUS

Richard C. Koch, Indianapolis, Ind., assignor to I.D.E.A., Incorporated, Indianapolis, Ind.

Application March 25, 1955, Serial No. 496,779

3 Claims. (Cl. 250—20)

Figure 1:
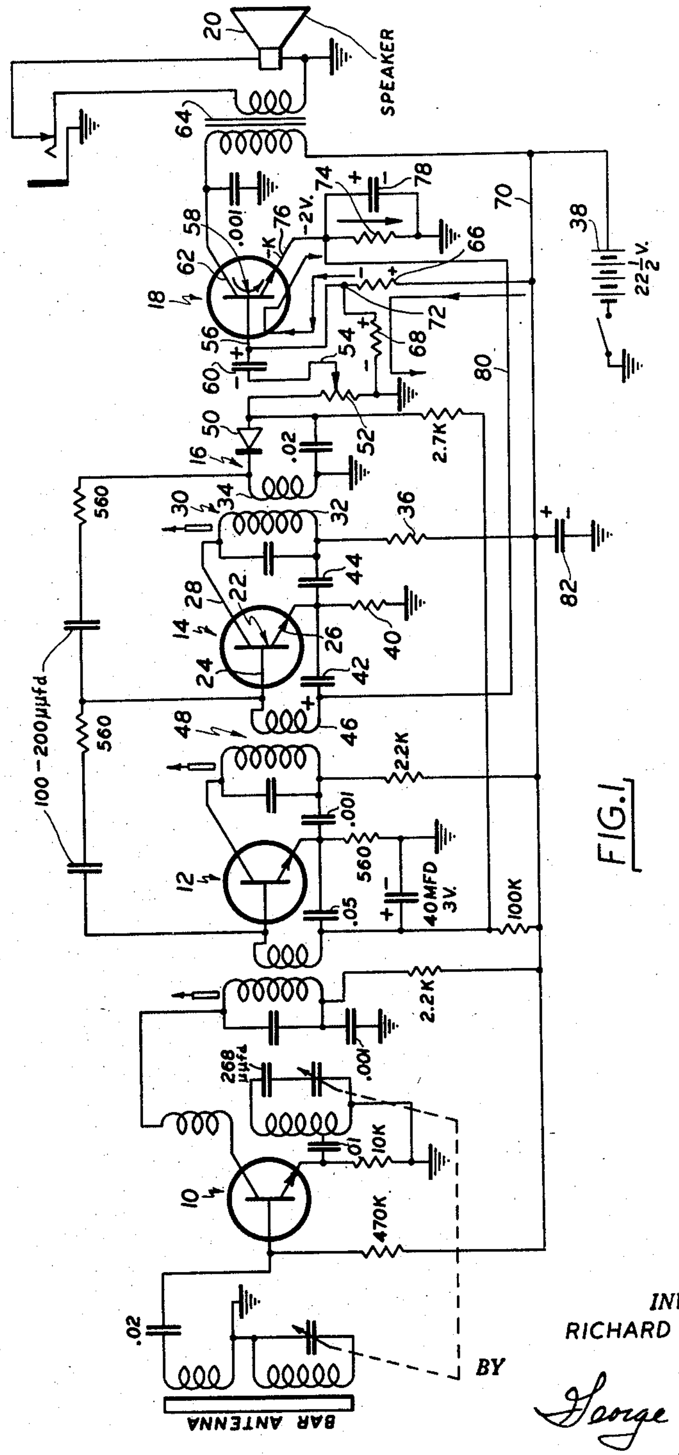

The present invention relates to transistor radio apparatus, and more particularly to circuitry incorporating transistors for use in a radio receiver.

Because of the small size of transistors, it is possible to make a radio receiver of miniature size, and with recent developments, to make a complete superheterodyne receiver which will fit inside an ordinary shirt pocket. In order to gain commercial acceptance of such small radios, it is necessary that the size of the power supply or battery be small enough for incorporation in the radio package, and, this being true, it is obviously necessary that the battery be of negligible size. Since the power output capabilities of tiny batteries corresponds to the size thereof, the radio can only draw a minimum of current in order to obtain acceptable battery life. This means that power consumption by the radio must be negligible.

In achieving these desiderata, it is therefore necessary that the radio circuitry be so arranged as to consume a minimum of current, and, of course, make efficient use of the current that is used.

It is an object of this invention to provide a radio receiver which consumes a minimum of current and which utilizes consumed current with maximum efficiency.

It is another object of this invention to provide a biasing circuit supplied with battery power which serves one transistor stage of the radio, and an auxiliary biasing circuit which operates off normal transistor current for producing a bias for another transistor stage in the radio.

Other objects will become apparent as the description proceeds.

An exemplary embodiment of this invention which is adapted for use in a pocket sized radio comprises two signal-handling stages, two transistors for these stages respectively, each transistor having base, emitter and collector elements, a biasing network for one stage and comprising a source of bias for the base element thereof, biasing means coupled to the emitter element of said one stage which produces a bias in response to current flow between the respective base and emitter elements, and means conductively interconnecting said bias means to the base element of the other stage whereby bias developed by said bias means is applied to the base element of said other stage.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 2:
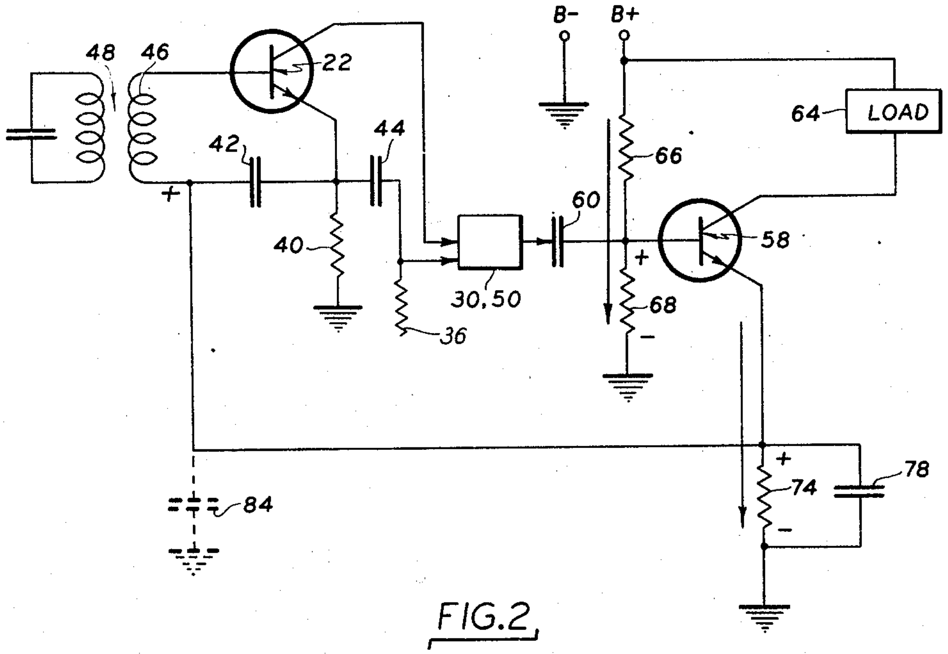

In the drawings:

Fig. 1 is a schematic diagram of a radio receiver constructed in accordance with the principles of this invention; and Fig. 2 is an equivalent circuit diagram of a portion thereof.

The circuit diagram of Fig. 1 represents a commercially available pocket sized radio made by the assignee of this invention, doing business as the Regency Division of I.D.E.A., Incorporated, 7900 Pendleton Pike, Indianapolis, Indiana. It bears the Model No. TR–1.

Generally, the radio is composed of a mixer-oscillator stage 10, two stages 12 and 14 of intermediate frequency amplification, a diode detector circuit 16, and a stage 18 of audio amplification. This receiver is a superheterodyne with the mixer-oscillator 10 supplying an intermediate frequency signal to the amplifiers 12 and 14. The amplified intermediate frequency signal is detected by the diode detector 16 and coupled to the audio amplifier 18 which amplifies the detected signal for application to a conventional speaker 20. The operation of the receiver is conventional, and therefore needs no further elaboration for the person skilled in the art.

The intermediate frequency amplifier 14 is composed of a transistor 22 having base, emitter and collector elements 24, 26 and 28, respectively.

To the collector element 28 is connected the usual intermediate frequency transformer 30 having primary and secondary windings 32 and 34, respectively. An isolating resistor 36 coupled supply voltage derived from the small battery 38 to the transformer primary 32 and an emitter resistor 40 is connected between the emitter 26 and ground. Suitable bypass condensers 42 and 44 are connected between the emitter 26 and the base and collector circuits, respectively. The condenser 42 is actually connected to the base element 24 through the secondary winding 46 of the intermediate frequency transformer 48.

The detecting circuit 16 is composed of the usual crystal diode detector 50 connected to one end of the transformer secondary 34, the latter being grounded as shown. One side of the diode is grounded through a potentiometer or volume control 52. The variable contact 54 of the potentiometer is connected to the base element 56 of transistor 58 by means of the coupling condenser 60. The collector element 62 is conductively connected to the primary of an output transformer 64 which is conductively connected to the B supply battery 38.

The biasing circuit for the base element 56 is composed of a network of two resistors 66 and 68 which are connected in series between ground and the battery supply line 70. The juncture 72 of these two resistors is connected directly to the base element 56. A resistor 74 is connected between the emitter element 76 and ground as shown. A large capacity audio frequency bypass condenser 78 is shunted across the resistor 74.

A connection 80 is made between the upper end of resistor 74 and the lower end of the intermediate frequency transformer secondary 46 for providing a conductive connection between base element 24 of transistor 22 and the emitter 76 of transistor 58.

In operation, current flows from the battery 38 through the line 70 and through the two resistors 66 and 68 to ground. The drop in voltage produced over the resistor 68 provides a biasing potential for the base element 56.

Current flowing through the emitter element 76 flows to ground through the emitter resistor 74. The voltage drop produced over the resistor 74 provides a biasing potential for the base element 24 of the transistor 22 via the conducting connection 80.

In the operation of transistors, it is necessary that the base element be positive with respect to the emitter element. By reason of the fact that current flows through the emitter resistor 74 in the direction of the arrow, the line 80 serves to apply a bias to the base element 24 which is positive with respect to ground.

Thus, the original biasing network which composed the battery 38 and the two resistors 66 and 68 provides the necessary positive bias for the base element 56 of the transistor 58. It is apparent that this biasing network 66, 68 draws current from the battery 38 for developing the biasing potential. Such current in the case of miniature radios of the type with which this invention is primarily concerned is of considerable magnitude. Therefore, it is highly desirable that a minimum of such battery-consuming networks be used.

Instead of using a biasing circuit similar to the network 66, 68 for the transistor 22, biasing voltage is taken directly from the emitter resistor 74 of the transistor 58. Since the base element 24 is to be positively biased, such bias is available at the upper end of the resistor 74.

Thus it is apparent that two transistors are effectively biased by use of a single biasing network 66, 68. The biasing voltage derived from the resistor 74 is produced by the normal emitter current flowing primarily between the elements 62 and 76 of the transistor 58. This current is ever present during normal operation, whereupon it may be used for producing the bias voltage for the base element 24.

This invention makes possible the use of a smaller battery 38 than was heretofore possible. Further, the battery drain is effectively reduced, thereby providing longer operating life.

It is further evident that the number of parts used in the radio are reduced by reason of the fact that it is not necessary to use a second biasing circuit such as the network 66, 68 nor an additional capacitor 84 in the stage 14 which normally is coupled between the lower end of the transformer secondary 46 and ground as shown in dashed lines in Fig. 2. The capacitor 78 actually replaces the conventional capacitor 84 just described and serves effectively the two stages 14 and 18 respectively.

Recapitulating, this invention makes possible lower current drain, hence longer battery life, while simultaneously accomplishing the use of fewer component parts.

While this invention is directed primarily at the feature of increasing battery life and reducing the number of parts, the remaining novel features of the circuit are covered in other applications for U.S. Letters Patent.

While it will be understood that the circuit specifications of the receiver of this invention may vary according to design preferences, the following circuit specifications are included by way of example only, as suitable for a receiver operating in the standard broadcast range:

| | |
|---|---|
| Transistors 12 and 22 | TI222.[1] |
| Transistor 58 | TI210.[1] |
| Transistor 36 | 2,200 ohms. |
| Battery 38 | 22.5 volts. |
| Resistor 40 | 2,700 ohms. |
| Condenser 42 | .05 mfd. |
| Condenser 44 | .001 mfd. |
| Potentiometer 52 | 1,000 ohms. |
| Condenser 60 | 2 mfd. at 3 volts. |
| Resistor 66 | 33,000 ohms. |
| Resistor 68 | 3,900 ohms. |
| Resistor 74 | 1,000 ohms. |
| Condenser 78 | 40 mfd. at 3 volts. |
| Condenser 82 | 5 mfd. at 25 volts. |

[1] A product of Texas Instruments Co.

Values of the other component parts of the circuit are indicated directly on the drawing. The values of the condensers are in microfarads except as otherwise shown and the values of the resistors are in ohms, the letter "K" representing a multiplier of 1,000.

What is claimed is:

1. For use in electronic apparatus: two isolated signal-handling circuits respectively arranged for handling signals having different frequency ranges, each of said circuits including a transistor having at least base, emitter and collector elements, said circuits having a reactive signal coupling therebetween; a voltage dividing resistance network connected between a source of supply voltage and ground, a point on said voltage dividing network being connected to the base of one of said transistors for supplying a base-biasing voltage thereto; and a circuit including a resistor serially connected with one of the emitter and collector elements of said one transistor, a point on said last named circuit being directly conductively connected to the base element of the other transistor for supplying a base-biasing voltage thereto responsive to the voltage drop across at least a part of said resistor.

2. For use in electronic apparatus: first and second isolated signal-handling circuits respectively arranged for handling signals having different frequency ranges, each of said first and second signal-handling circuits including a transistor having at least base, emitter and collector elements; another signal-handling circuit reactively coupled between said first and second signal handling circuits; a voltage dividing resistance network connected between a source of supply voltage and ground, a point on said voltage dividing network being connected to the base of one of said transistors for supplying base-biasing voltage thereto; and a circuit including a resistor serially connected with the emitter element of said one transistor, a point on said last-named circuit being directly conductively connected to the base element of the other transistor for supplying a base-biasing voltage thereto responsive to the voltage drop across at least a part of said resistor.

3. In a battery powered superheterodyne radio receiver; an intermediate frequency amplifier stage including a first transistor having at least base, emitter and collector elements; a first intermediate frequency transformer having one end of its secondary winding connected to the base of said first transistor and its other end capacitively coupled to the emitter thereof; another intermediate frequency transformer having its primary winding coupled to the output circuit of said intermediate frequency amplifier stage; a detector circuit coupled to the secondary winding of said other intermediate frequency transformer; an audio frequency amplifier stage having its input circuit coupled to said detector circuit and including a second transistor having at least base, emitter, and collector elements; a voltage dividing resistance network connected between one terminal of a battery and ground, a point on said voltage dividing network being connected to the base of said second transistor for supplying base-biasing voltage thereto; and a resistor serially connected between the emitter of said second transistor and ground, the emitter of said second transistor being directly connected to said other end of said first intermediate frequency transformer for supplying base-biasing voltage to said first transistor responsive to the voltage drop across said resistor due to emitter current flow therein.

References Cited in the file of this patent

UNITED STATES PATENTS

| | | |
|---|---|---|
| 2,316,577 | Ford | Apr. 13, 1943 |
| 2,364,238 | Nicholson | Dec. 5, 1944 |
| 2,432,033 | Nicholson | Dec. 2, 1947 |
| 2,663,806 | Darlington | Dec. 22, 1953 |
| 2,761,916 | Barton | Sept. 4, 1956 |
| 2,762,875 | Fischer | Sept. 11, 1956 |
| 2,807,758 | Pinckaers | Sept. 24, 1957 |